United States Patent
Lanker et al.

(10) Patent No.: US 7,058,262 B2
(45) Date of Patent: Jun. 6, 2006

(54) ARRAYED WAVEGUIDE GRATING

(76) Inventors: Michael Lanker, In der Grand 10, CH-8126 Zumikin (CH); Harm Weerden, 7546 GT, Springendalhoek 22, NL-Enschede (NL)

( * ) Notice: Subject to any disclaimer, the term of this patent is extended or adjusted under 35 U.S.C. 154(b) by 176 days.

(21) Appl. No.: 10/451,068

(22) PCT Filed: Oct. 3, 2001

(86) PCT No.: PCT/GB01/04379

§ 371 (c)(1),
(2), (4) Date: Dec. 2, 2003

(87) PCT Pub. No.: WO02/052319

PCT Pub. Date: Jul. 4, 2002

(65) Prior Publication Data

US 2004/0096157 A1    May 20, 2004

(30) Foreign Application Priority Data

Dec. 22, 2000  (GB) ................................. 0031549.9
Mar. 12, 2001  (GB) ................................. 0106013.6

(51) Int. Cl.
*G02B 6/34* (2006.01)
(52) U.S. Cl. ............................. 385/37; 385/31; 385/43; 385/46
(58) Field of Classification Search ................. 385/37
See application file for complete search history.

(56) References Cited

U.S. PATENT DOCUMENTS 6,069,990 A    5/2000  Maru
(Continued)

FOREIGN PATENT DOCUMENTS

DE    196 04 438    2/1997
(Continued)

OTHER PUBLICATIONS

Patent Abstracts of Japan, vol. 018, No. 126 (P-1702) Mar. 2, 1994 corresponding to JP 05 313029 A (Nippon Telegr & Teleph Corp) dated Nov. 26, 1993.
(Continued)

*Primary Examiner*—Frank G. Font
*Assistant Examiner*—James P. Hughes

(57) ABSTRACT

An arrayed waveguide grating (AWG) device is described in which there are a plurality of output waveguides (10) coupled at one end to the output side of an second optical interaction region (4) of the AWG, and wherein the output waveguides are substantially identically curved in at least a portion of the fan-out region of the AWG. This improves the channel (frequency) spacing accuracy of the AWG. In one embodiment input waveguides (2) of the AWG are also substantially identically curved in at least a portion of the fan-in region of the AWG, these being inversely curved to the substantially identically curved portions of the output waveguides, with respect to the direction of travel of light along the waveguides. This has been found to reduce asymmetry in the channel output response.

20 Claims, 6 Drawing Sheets

U.S. PATENT DOCUMENTS

| | | | | |
|---|---|---|---|---|
| 6,836,594 | B1* | 12/2004 | Hosoi | 385/37 |
| 2003/0063858 | A1* | 4/2003 | Bulthuis et al. | 385/37 |
| 2004/0096158 | A1* | 5/2004 | Yoneda | 385/37 |
| 2004/0151435 | A1* | 8/2004 | Hosoi | 385/37 |
| 2005/0135748 | A1* | 6/2005 | Yamazaki | 385/37 |

FOREIGN PATENT DOCUMENTS

| | | |
|---|---|---|
| EP | 0 583 903 | 2/1994 |
| JP | 05313029 | 11/1993 |
| JP | 08334792 | 12/1996 |

OTHER PUBLICATIONS

M. R. Amersfoort et al, <<Phased-Array Wavelength Demultiplexer with Flattened Wavelength Response>>, Electronics Letters, IEE Stevenage GB, vol. 30, No. 4, Feb. 17, 1994, pp. 300-302, XP000439510.

Patent Abstracts of Japan, vol. 1997, No. 04, Apr. 30, 1997 corresponding to JP 08 334792 A (Nippon Telegr & Amp) dated Dec. 17, 1996.

C. Dragone, "An NxN Optical Multiplexer using a Planar Arrangement of two Star Couplers", IEEE Photonics Technology Letters, IEEE Inc., NY, US, vol. 3, No. 9 Sep. 1, 1991 pp., 812-815, XP000225792.

M. K. Smit et al, "Phasar-Based WDM-Devices: Principles, Design and Applications", IEEE Journal of Selected Topics in Quantum Electronics, IEEE Service Center, US, vol. 2,, No. 2, Jun. 1, 1996, pp. 236-250, XP000685236.

* cited by examiner

ARRAYED WAVEGUIDE GRATING

The present invention relates to dispersive optical devices. More specifically, but not exclusively, the invention relates to an arrayed waveguide grating device.

In order to meet the ever-increasing demand for transmission bandwidth in communication networks, operators are investing heavily in the development of techniques for Dense Wavelength Division Multiplexing (DWDM). DWDM employs many closely spaced carrier wavelengths, multiplexed together onto a single waveguide such as an optical fibre. The carrier wavelengths are spaced apart by as little as 50 GHz in a spacing arrangement designed in the style of an ITU (International Telecommunications Union) channel "grid". Each carrier wavelength may be modulated to provide a respective data transmission channel. By using many channels, the data rate of each channel can be kept down to a manageable level.

Clearly, to utilize this available bandwidth it is necessary to be able to separate, or demultiplex, each channel at a receiver. New optical components for doing this have been designed for this purpose, one of these being the Arrayed Waveguide Grating (AWG). An arrayed waveguide grating is a planar structure comprising a number of arrayed waveguides which together act like a diffraction grating in a spectrometer. AWGs can be used as multiplexers and as demultiplexers, and a single AWG design can commonly be used both as a multiplexer and demultiplexer. A typical AWG mux/demux 1 is illustrated in FIGS. 1(a) and (b) and comprises a substrate or "die" 1 having provided thereon one or more input waveguides 2 for a multiplexed input signal, two slab couplers 3,4 connected to either end of an array 5 of transmission waveguides 8, only some of which are shown, and a plurality of output waveguides 10, which are commonly single mode or substantially single mode waveguides, for outputting respective wavelength channel outputs from the second (output) slab coupler 4 to the edge 12 of the die 1. The array 5 of transmission waveguides exhibits dispersive imaging properties like that of a diffraction grating, so that input WDM signals are dispersed and focused to respective ones of the output waveguides. Often, the input and/or output waveguides 2,10 are each tapered (usually adiabatically tapered) at a respective first end 7,11 thereof, where they are coupled to the first or second slab coupler respectively, the taper being such that the width of the waveguide increases towards the slab coupler 4,5. The output waveguides 10 are arranged to "fan-out" from their first ends 11, away from each other and from the coupler (i.e. the lateral spacing between the waveguides is increased), so as to achieve a desired physical spacing between the output waveguides, at an output edge of the device.

One known problem with such AWG devices is that the channel outputs from the output waveguides tends to deviate from the ideal device response in which the central frequencies of the channels are equally spaced apart, as illustrated in FIG. 2(a). Instead, the output from each channel is often not centred on the respective desired frequency $f_1, f_2, f_3, \ldots$ but is instead centred on a slightly different frequency. We believe these inaccuracies in channel spacing result, at least in part, from the shape and arrangement of the output waveguides, further influenced by manufacturing process aberrations introduced during manufacture of the device. In particular, we believe the radius of curvature of each of the output waveguides, particularly in the fan-out region where the output waveguides fan-out from the second slab coupler, is a significant contributing factor in the channel spacing inaccuracies experienced in the manufactured devices, particularly where tapers are used on said first ends 11 of the output waveguides.

It is an object of the present invention to avoid or minimize one or more of the foregoing disadvantages.

According to a first aspect of the invention there is provided an arrayed waveguide grating device comprising: first and second optical interaction regions between which an input optical signal propagates from a first position on a first side of the first optical interaction region to a second position on a second side of the second optical interaction region, a correspondence between said first and second positions depending upon a wavelength of the optical signal; a plurality of array waveguides coupled between a second side of the first optical interaction region and a first side of the second optical interaction region; and a plurality of output waveguides coupled at one end to the second side of the second optical interaction region; wherein the output waveguides are arranged to fan-out from the second optical interaction region, in a fan-out region of the device which comprises an initial portion of the length of each output waveguide, and the waveguides in the fan-out region are substantially identically curved in at least a portion of the fan-out region.

The device according to the invention has the advantage of improved channel spacing accuracy i.e. avoiding, or at least minimizing, deviations in channel spacing from the desired, ideal channel spacing which the device is designed to achieve.

The waveguides in the fan-out region preferably all have substantially the same radius of curvature in at least a portion of the fan-out region. Alternatively, the waveguides may each have a continuously varying radius of curvature, in the fan-out region, in which case the radius of curvature of each waveguide varies substantially identically to that of the other waveguides, along corresponding portions of the lengths thereof, in at least a portion of the fan-out region.

Preferably, the waveguides are identically, or near identically, curved in at least a portion of the fan-out region, but alternatively there may be small variations in the radius of curvature between any two or more of the output waveguides, but preferably no two output waveguides differ in radius of curvature by more than 5 mm, advantageously no more than 1 mm, and most preferably no more than 0.5 mm.

Preferably, the output waveguides are single mode, or substantially single mode, waveguides which are preferably tapered in width at the ends thereof which are coupled to the second optical interaction region, so as to increase in width towards the second optical interaction region.

Preferably, the portions of the waveguides having substantially equal radius of curvature, or substantially identically varying radius of curvature, are adjacent the respective tapered ends thereof. Preferably, the radius of curvature of these portions is kept sufficiently low to substantially filter out any psuedo higher order modes which may arise where the output waveguides are coupled to the second optical interaction region, while still being sufficiently high to avoid unacceptably high radiation losses in the output waveguides.

The waveguides preferably each comprise a core region having cladding material at least on either side of the core region. In our preferred embodiment, the difference between the refractive indices of the core region and cladding material is 0.01 and the core size is 6×6 μm in cross-section, and the radius of curvature of the waveguides in the portion of the fan-out region in which the waveguides are substantially identically curved is preferably in the range of 16 mm or less, preferably between 5.5 and 10 mm, most preferably substantially 8 mm.

The device may conveniently be a planar waveguide-type device which is generally rectangular in shape, having an input edge, an output edge, and two side edges. A second end of each output waveguide may conveniently lie along an output edge of the device. Advantageously, the output waveguides may be substantially identically curved throughout a substantial portion of the fan-out region, preferably in the range of 3–20% of the length of the fan-out region, most preferably between 5 and 10%, as measured along a said side edge of the device which is perpendicular to the output edge of the device.

The device may further include at least one input waveguide coupled to a first side of the first optical interaction region. The or each input waveguide is preferably also a single mode, or substantially single mode, waveguide and may also be tapered in width at the end thereof which is coupled to the first optical interaction region, so as to increase in width towards the first optical interaction region. Where there are a plurality of input waveguides, the input waveguides are preferably arranged to fan-in towards the first optical interaction region, in a fan-in region which comprises a portion of the length of each input waveguide, and all the input waveguides may also be substantially identically curved in at least a portion of the fan-in region.

Preferably, the substantially identically curved portions of the input waveguides are substantially inversely curved to the said substantially identically curved portions of the output waveguides, with respect to the direction of travel of light along the waveguides. Where the input waveguides are tapered in width at the ends thereof where they are coupled to the first optical interaction region and the output waveguides are tapered in width at the ends thereof where they are coupled to the second optical interaction region, the substantially identically curved portions of the input waveguides are preferably adjacent the respective tapered ends thereof, the substantially identically curved portions of the output waveguides are preferably adjacent the respective tapered ends thereof, and said substantially identically curved portions of the input waveguides preferably have a radius of curvature of equal magnitude to the radius of curvature of said substantially identically curved portions of the output waveguides.

According to another aspect of the invention there is provided an arrayed waveguide grating comprising:

a substrate having first and second slab couplers;

a plurality of array waveguides optically coupled between the first and second slab couplers and having respective predetermined optical path length differences therebetween;

at least one input waveguide optically coupled at a first end thereof to an input side of the first slab coupler;

a plurality of output waveguides optically coupled at first ends thereof to an output side of the second slab coupler;

the output waveguides are arranged to fan-out from the second slab coupler, in a fan-out region of the device which comprises an initial portion of the length of each output waveguide; wherein the output waveguides in the fan-out region are substantially identically curved in at least a portion of the fan-out region, preferably proximal to the first ends of the output waveguides, and a corresponding portion of the or each said input waveguide is substantially inversely curved to said substantially identically curved portions of the output waveguides, with respect to the direction of travel of light along the waveguides.

Preferably, the substantially identically curved portions of the input waveguide(s) have a radius of curvature of equal magnitude to the radius of curvature of the corresponding substantially identically curved portions of the output waveguides.

The advantage of the inversely curved waveguide portions is that this compensates, at least to some extent, for the asymmetric effects which the bends in the waveguides, principally in the regions adjacent the slab couplers, have on the shape of the channel output (spectral) response of the AWG, so that a substantially symmetric channel output response is obtained.

Preferred embodiments of the invention will now be described by way of example only and with reference to the accompanying drawings in which.

Figure 3A:
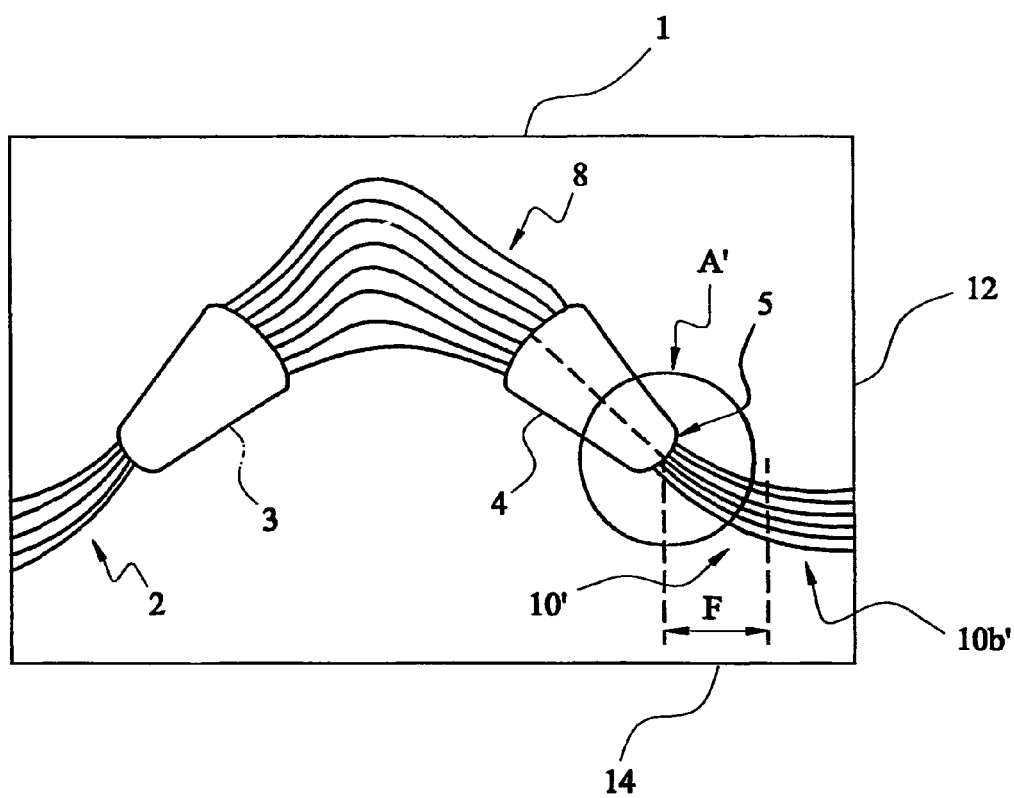
FIG. 3(a) shows an arrayed waveguide grating according to the invention.
Figure 4A:
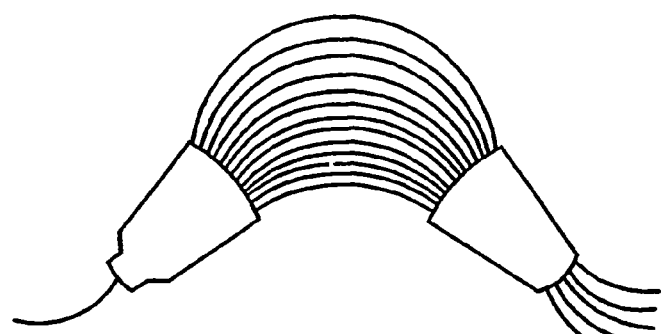
Figure 4B:
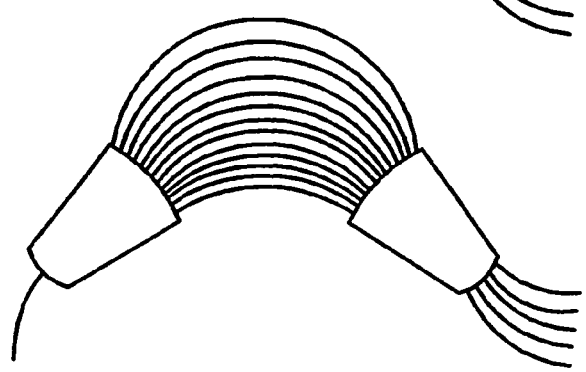
Figure 5:
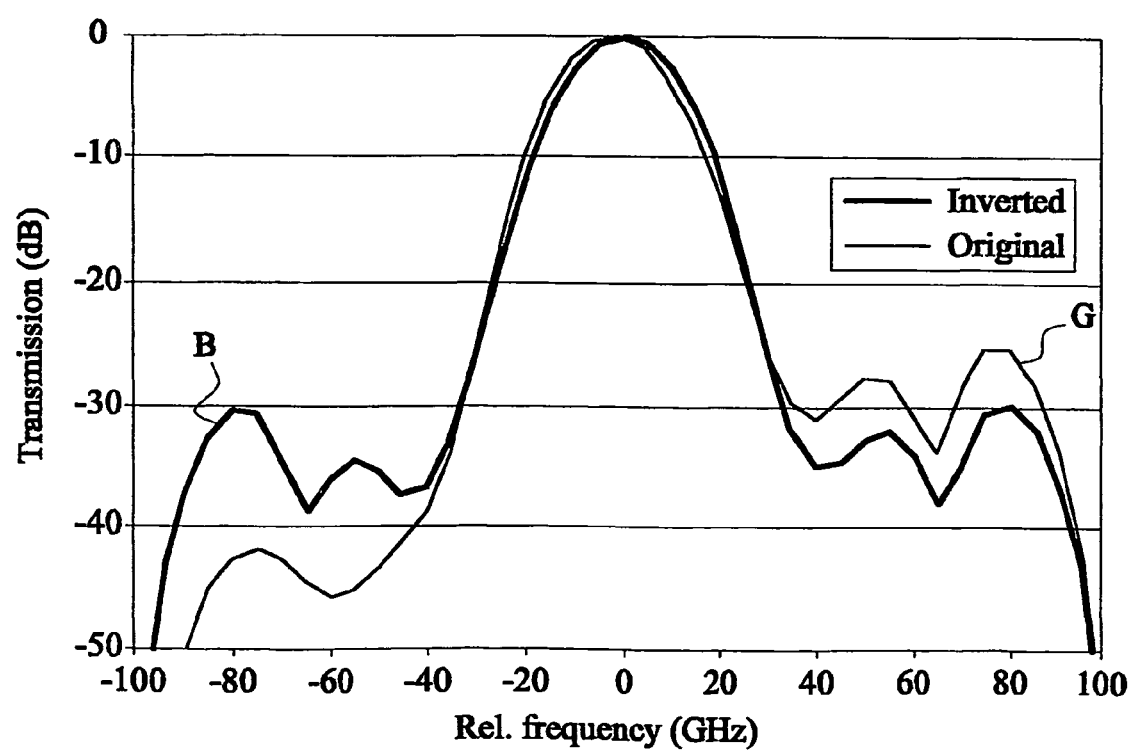
Figure 6A:
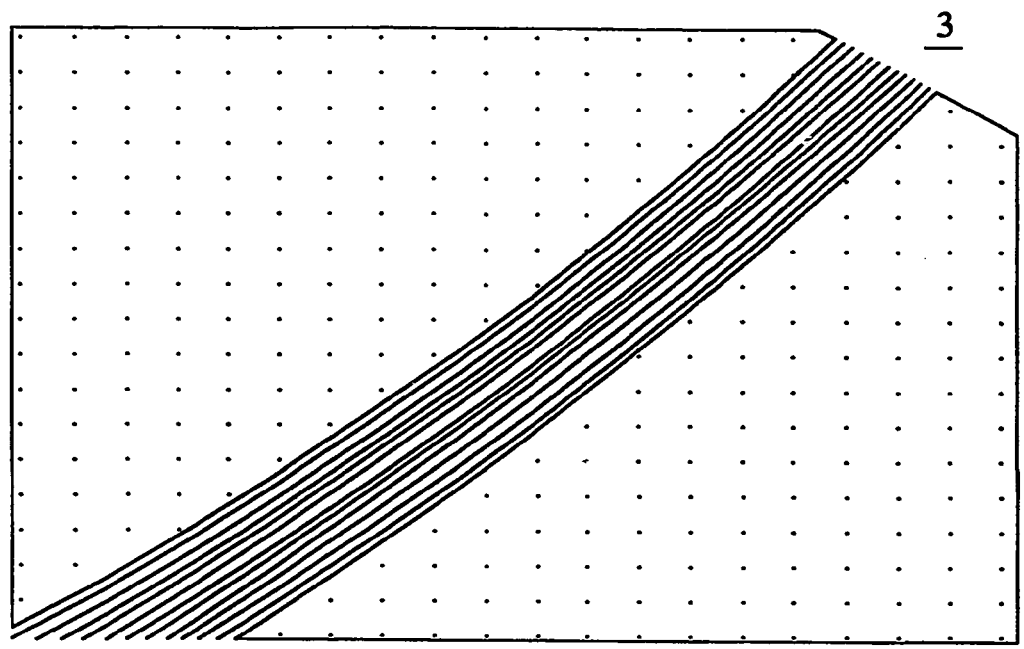
Figure 7A:
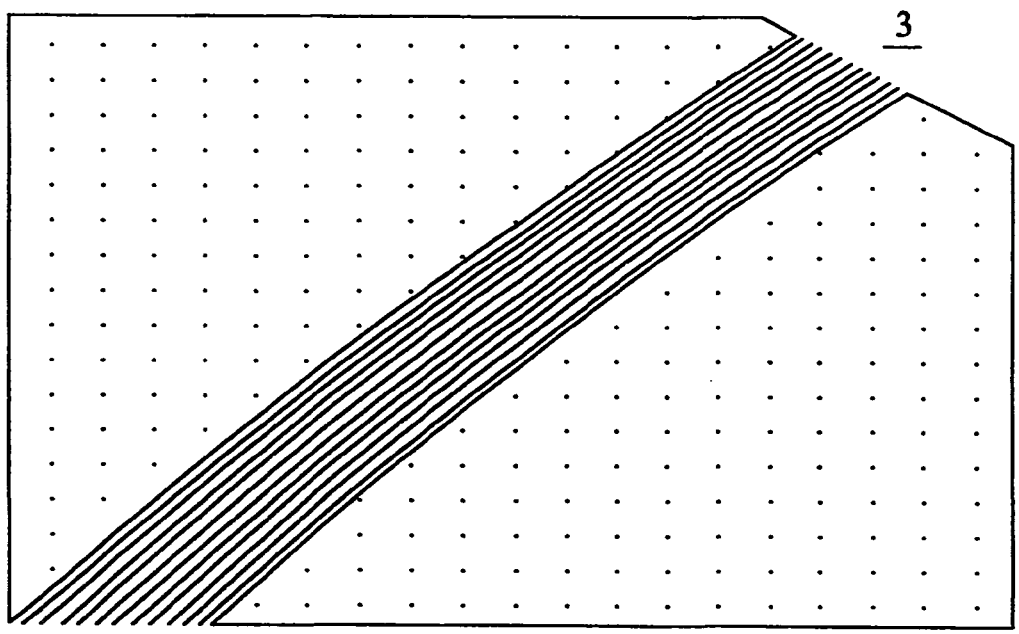

FIGS. 4(a) and (b) compare schematically the AWG of FIGS. 3(a) and (b) with a modified version of the AWG according to another embodiment of the invention;

FIG. 5 is a graph of Transmission vs. Relative frequency illustrating the output response of one channel of an AWG according to FIGS. 3(a),(b) as compared with the output response of the same channel in an AWG incorporating the modification illustrated in FIG. 4(b);

FIGS. 6(a) and (b) illustrate in greater detail identically curved portions of input and output waveguides in the AWG of FIGS. 3(a) and (b);

FIGS. 7(a) and (b) illustrate in greater detail the same portions of the input and output waveguides, incorporating the modification of FIG. 4(b).

Figure 1A:
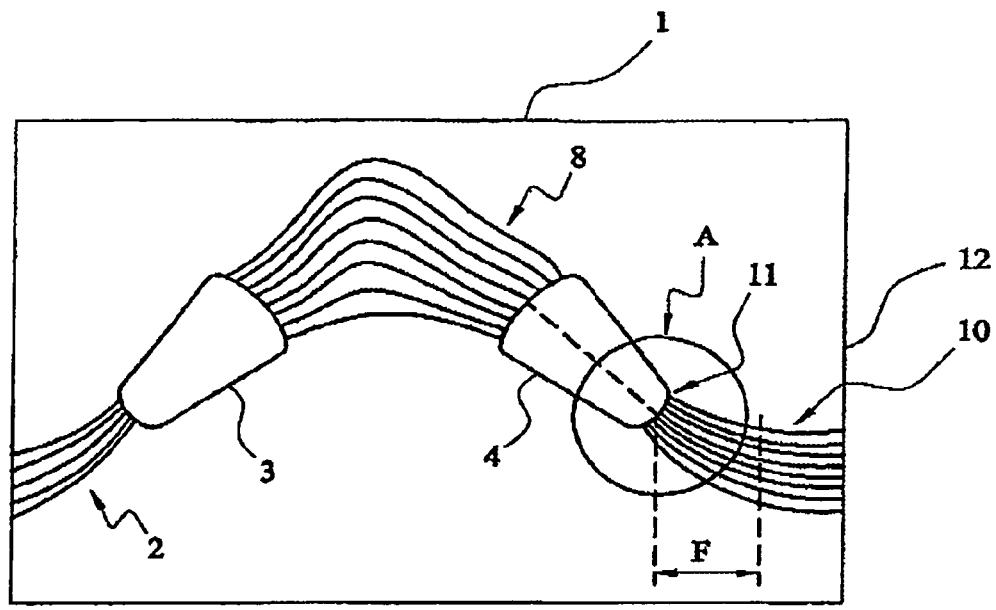
FIG. 1(a) is a schematic plan view of a known arrayed waveguide grating device.

FIGS. 3(a) and (b) illustrate respectively an arrayed waveguide grating (AWG) device, and the arrangement of output waveguides 10' in an AWG, according to one embodiment of the invention. Like components to those of FIG. 1(a) are referenced by like reference numerals. The AWG device is formed on a substrate or "die" 1 and comprises at least one input waveguide 2, a first optical interaction region in the form of a slab coupler 3, an array of waveguides 8 (only some shown) of different optical path lengths and arranged between the first slab coupler and a second slab coupler 4 (providing a second optical interaction region), and a plurality of output waveguides 10' (only six shown). The output waveguides are single mode waveguides, or alternatively substantially single mode waveguides (in the sense that overall they effectively operate as if they were single mode). In generally known manner there is a constant predetermined optical path length difference between adjacent waveguides in the array, which determines the position of the wavelength output channels on an output face 5 of the second slab coupler 4. Typically, the physical length of the waveguides increases incrementally by the same amount, $\Delta L$, from one waveguide to the next, where $$\Delta L = m\lambda_c/n_c$$

where $\lambda_c$ is the central wavelength of the grating, $n_c$ is the effective refractive index of the array waveguides, and m is an integer number. The construction and operation of such AWGs is well known in the art and is described, for example, in "PHASAR-based WDM-devices: principles, design and applications", M K Smit and C. van Dam, J. Selected Topics in Quantum Electronics 2, 1996, pp236–250, and in "An N×N optical multiplexer using a planar arrangement of two star couplers", C. Dragone, Photonics Technology Letters, 9, 1991, vol 3, pp812–815.

Figure 1B:
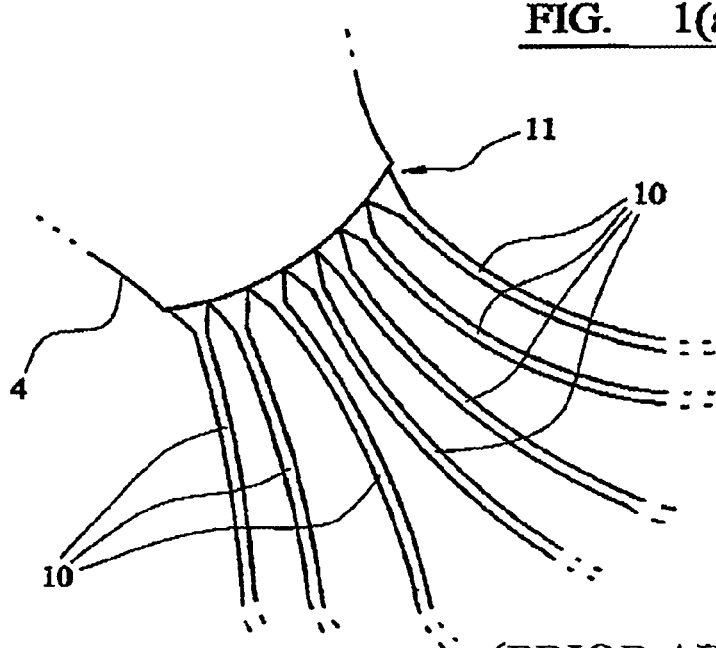
FIG. 1(b) is a magnified schematic view of the ringed portion A of the device of FIG. 1(a)

The output waveguides 10' are each tapered adiabatically at a first end 11 thereof, where they are coupled to the output face 5 of the second slab coupler 4, in like manner to the device of FIGS. 1(*a*) and (*b*). The output waveguides 10' also "fan-out" from their first ends 11' towards the output edge 12 of the device, so as to achieve a desired physical separation of the output channels at the output edge 12 of the device. The area of the device in which the lateral separation of the waveguides increases, from their spacing at the output face 5 of the second slab coupler 4 to the final desired lateral spacing, is hereinafter referred to as the fan-out region. In the fan-out region the waveguides are curved. Output end portions 10b' of the output waveguides 10', adjacent the output edge 12, are substantially perpendicular to the output edge 12, in plan view of the AWG device. References made hereinafter to the length F of the fan-out region refer to the length of the fan-out region as measured along a bottom edge 14 of the device, which edge is perpendicular to the output edge 12, as shown in FIG. 3(*a*).

The device is provided as a planar silica-on-silicon chip produced by, for example, Flame Hydrolysis Deposition (FHD) of Chemical Vapour Deposition (CVD). Each of the waveguides 2,8,10' is of typical optical waveguide construction comprising a core region with a cladding material at least on either side of, and in our preferred embodiments also covering, the core region. In generally known manner, the core region is formed on a substrate of silicon, silica ($SiO_2$) or the like, which may (if not made of silica) have a silica buffer layer deposited thereon before the core and cladding regions are deposited.

Figure 3B:
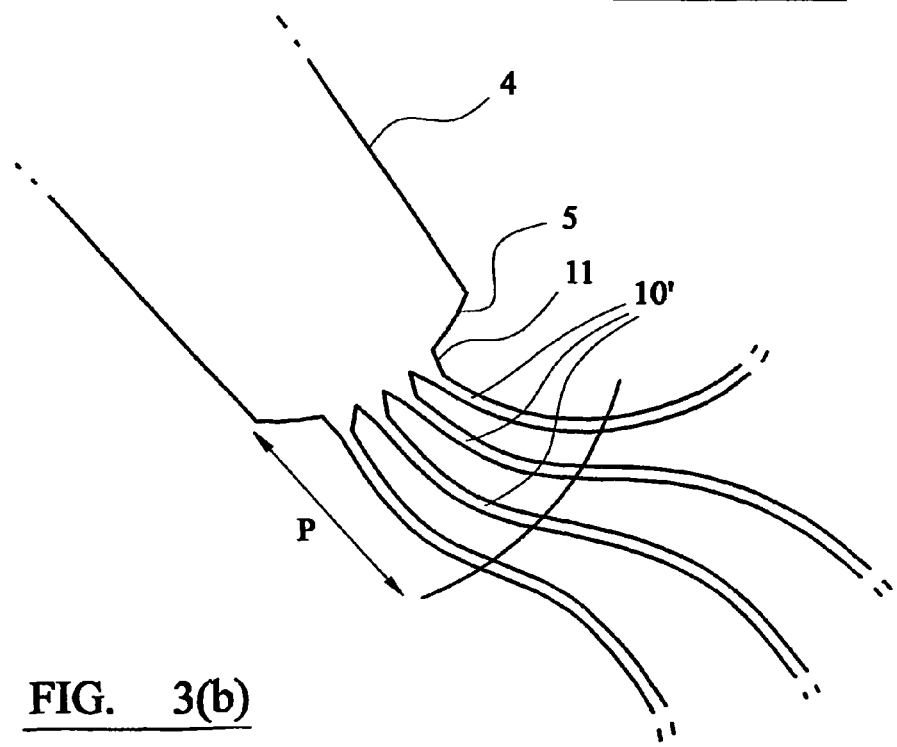
FIG. 3(b) is a magnified schematic view of the ringed portion A' of the device of FIG. 3(a)

FIG. 3(*b*) illustrates the arrangement of output waveguides 10' in the fan-out region. For clarity, only four of the output waveguides 10' are shown in FIG. 3(*b*). In practice there would be many more, for example 40 output waveguides for a 40-channel mux/demux. In a portion P of the fan-out region, this portion being adjacent the tapered ends 11 of the output waveguides, all the output waveguides have the same radius of curvature. In the illustrated embodiment, this "equal curvature" portion P comprises a substantial portion of the fan-out region, specifically in the range of 5 to 10% of the length F of the fan-out region. In the embodiment of FIG. 3 (which is not shown to scale), the length of the bottom edge 14 of the AWG device is 50 mm, and the "equal curvature" portion of the output waveguides spans approximately 1 mm of this length.

After these "equal curvature" sections of the waveguides, as illustrated in FIG. 3(*b*), the waveguides diverge so that some have an opposite radius of curvature to others. In fact, approximately half the output waveguides curve outwardly away from the other half of the waveguides, and vice versa. This particular arrangement is advantageous in that it allows greater compactness of the overall device to be achieved.

Beam Propagation Method (BPM) simulations have shown that the radius of curvature of the output waveguides, at the input ends 11 thereof, can affect the output channel spacing of the AWG device, in particular output waveguides with different radii of curvature can lead to inaccuracies in channel spacing. This is highly undesirable, as accurate channel spacing, in particular in terms of channel frequency, is a desired feature of any commercial AWG device. Our simulations also show that the detrimental effects due to different radii of curvature are greater the wider the tapers used on the input ends 11 of the output waveguides.

Additionally, it is known that output waveguides which are not exactly coupled to the second slab coupler 4 may excite higher order psuedo-modes in substantially single mode output waveguides which distort the optical field at the wide end of the taper. BPM simulations also show that this effect can be reduced by reducing the radius of curvature of the waveguides in the fan-out region. A narrower curve (i.e. smaller radius of curvature) can, at least to some extent, filter out such psuedo higher order modes, which a wider curve would not.

Therefore, the radius of curvature of the "equal curvature" portions of the output waveguides is chosen to be relatively small, while still within acceptable radiation losses for the output waveguides. In the described embodiment, we chose a radius of curvature of 8 mm, for a waveguide core size of 6×6 μm, and where the difference, $\Delta n$, of the refractive indices of the waveguide core and cladding is 0.01. We have found that for this core size, with this value of $\Delta n$, the radiation losses in the output guides are acceptable. For this embodiment, if a radius of curvature of less than 8 mm is used, the radiation losses become higher, particularly for below 5.5 mm where we have found these losses are unacceptably high. It will thus be generally understood that for waveguide designs with different core size and/or $\Delta n$ value to the described embodiment, the radius of curvature of the "equal curvature" sections should ideally be chosen so as to be high enough to avoid unacceptable radiation losses, but also low enough that the waveguides do function to filter out, or at least partially filter out, the psuedo higher order modes. This can be done empirically and/or via simulation. A working value for the maximum tolerable additional power loss attributable to radiation losses (i.e. over and above power loss due to other factors) in an output waveguide, due to bending of the waveguide, is generally accepted to be about 0.1 dB for a ninety degree bend in the waveguide.

In general, the longer the length of the "equal curvature" portion of the fan-out region (measured along the bottom edge 14), the larger will need to be the overall size of the AWG device. As it is usually desirable to make the AWG device as small as possible, the designer must therefore balance the benefits of using a larger "equal curvature" portion (potentially better filtering out of pseudo higher order modes and/or improved channel spacing accuracy) against the corresponding increase in overall size of the device.

As a further improvement, the input waveguides 2 may also be designed so that a portion of each input waveguide adjacent the first slab coupler 3 is substantially identically curved to a corresponding portion of all the other input waveguides, the radius of curvature again being chosen to be as low as possible while still high enough to avoid undesirably high radiation losses. This can be beneficial to filter out, or at least partially filter out, any pseudo higher order modes which may be present in the input waveguides. In the embodiment of FIG. 3(*a*) the input waveguides are single-mode, or substantially single-mode, waveguides which fan-in towards the first slab coupler 3. The input waveguides are adiabatically tapered at the ends thereof which are connected to the first slab coupler 3, and are all substantially identically curved for at least a portion of the fan-in region. It will be appreciated that further variations and modifications to the above-described embodiment are possible without departing from the scope of the invention. For example, instead of the output waveguides having one, equal, radius of curvature along at least a portion of the length thereof in the fan-out region, the radius of curvature of the waveguides may vary continuously along the length of each waveguide, or along at least a portion thereof. (For example, the path of each waveguide might be defined by a polynomial function.) In this case, according to the invention the radius of curvature of each waveguide would be varied identically to that of the other waveguides, along at least a portion of the length of the waveguides in the fan-out region. i.e. the waveguides would all have the same curvature along corresponding portions thereof, in at least a portion of the fan-out region.

Although the output waveguides are ideally identically curved in the portion P of the fan-out region, as described with reference to the embodiment of FIGS. 3(a) and (b), small variations in the radius of curvature are tolerable, within limits, while still achieving at least some of the benefit of the invention. We believe that variations in radius of curvature of no more than 5 mm between any two of the output waveguides is tolerable, with variation of no more than 1 mm, ideally no more than 0.5 mm, being most preferable.

In a further possibility instead of, or in addition to, tapers on the first ends 11 of the output waveguides, there may be a multi-mode interferometer (MMI) disposed between the second slab coupler 4 and the input ends 11 of each of the output waveguides, the slab coupler and MMIs together forming a desired "optical interaction region" between the output waveguides 10' and the array waveguides 8.

In another possible modified embodiment, there may be no tapers (or MMIs) on the input ends 11 of the output waveguides 10 (i.e. adjacent the second slab coupler 4). For example, in this embodiment the output waveguides may be multi-mode waveguides, for example two-mode waveguides transmitting both the fundamental and first order modes. While an embodiment with no tapers on the output waveguides may not be so susceptible to channel inaccuracies introduced due to unequal curvature of the output waveguides in the fan-out region, we envisage that the use of "equal curvature" waveguide sections according to the invention will still provide some benefit.

In a yet further embodiment there could be more than one single-mode output waveguide allocated for each output channel. For example, a respective pair of single mode waveguides may be provided to output each channel.

Figure 2A:
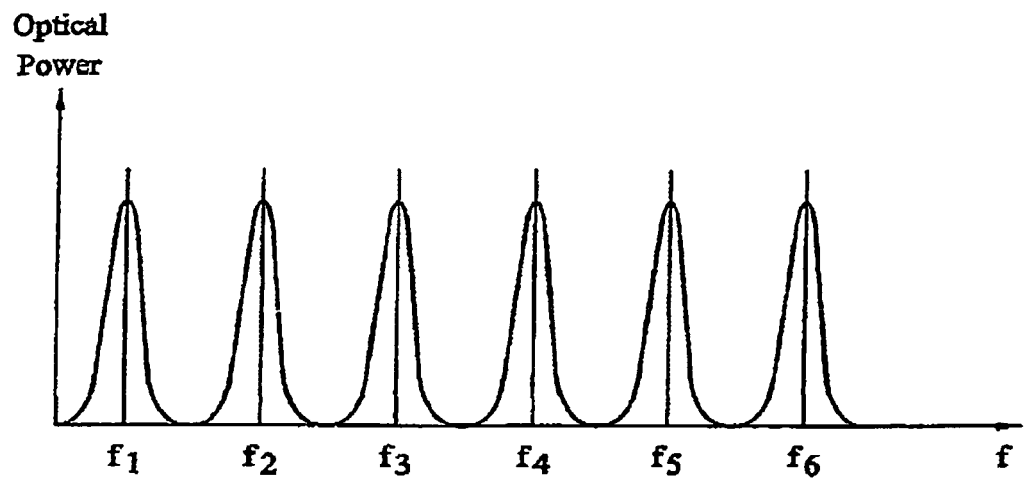
FIG. 2(a) illustrates an ideal channel spacing, in terms of frequency, of the output channels of the device of FIG. 1.
Figure 2B:
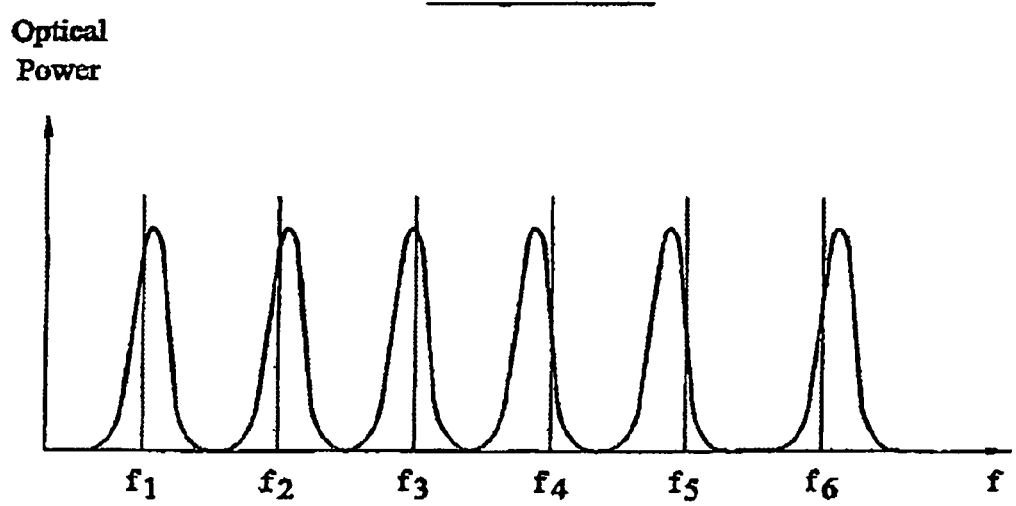
FIG. 2(b) illustrates a typical channel spacing, in terms of frequency, of the output channels of the device of FIG. 1.

One problem associated with the use of bends in the output waveguide sections is that the bends in the output waveguides adjacent the fan-out region tend to introduce an asymmetry into the output channel response. This asymmetry is due to the fact that where the output waveguide bends, the mode field of the optical signal being transmitted therein is distorted as the mode is pushed outwardly away from the centre of the arc of the bend (so that the mode is no longer symmetrical about the optical axis of the waveguide). Where the input waveguides also bend in the fan-in region in the manner shown in FIGS. 2 and 3(a), this tends to further exacerbate the asymmetric nature of the channel output response (also sometimes referred to as the transmission spectrum).

FIGS. 6(a) and (b) show in more detail corresponding input and output waveguide portions of an AWG of the type shown in FIG. 3(a) in which the input waveguides are identically curved in a portion of the fan-in region adjacent the tapered input waveguide ends at the input slab and the output waveguides are all identically curved (to one another) in a corresponding portion of the fan-out region adjacent the tapered output waveguide ends at the output slab. The input waveguides and the output waveguides all bend towards the bottom edge of the die 1 (in plan view of the die), with respect to the direction of travel of light along the waveguides. The grey line plot in FIG. 5 illustrates the resulting asymmetric channel output response for this AWG. The frequency values are given relative to the center channel frequency (which is represented as zero on the Rel. Frequency axis).

One consequence of the asymmetric output response is that it leads in practice to greater crosstalk between adjacent output channels than the AWG was designed for, which degrades the AWG performance as compared with the predetermined ITU grid response for which the AWG is designed.

Therefore, in a modified embodiment of the invention, we propose that the input waveguides 2 all have inverse curvature to the identically curved portions of the output waveguides, with respect to the direction of travel of light along the waveguides, for a corresponding portion of the lengths thereof in the region adjacent the input slab coupler 3. FIG. 4(a) shows schematically an AWG as described above with reference to FIGS. 6(a) and (b). FIG. 4(b) shows schematically the improved AWG having the inverse bend on the input waveguides. For clarity, only one input waveguide is shown in each case and the bend on the input waveguides has been heavily magnified (as compared with the actual device).

Figure 7B:
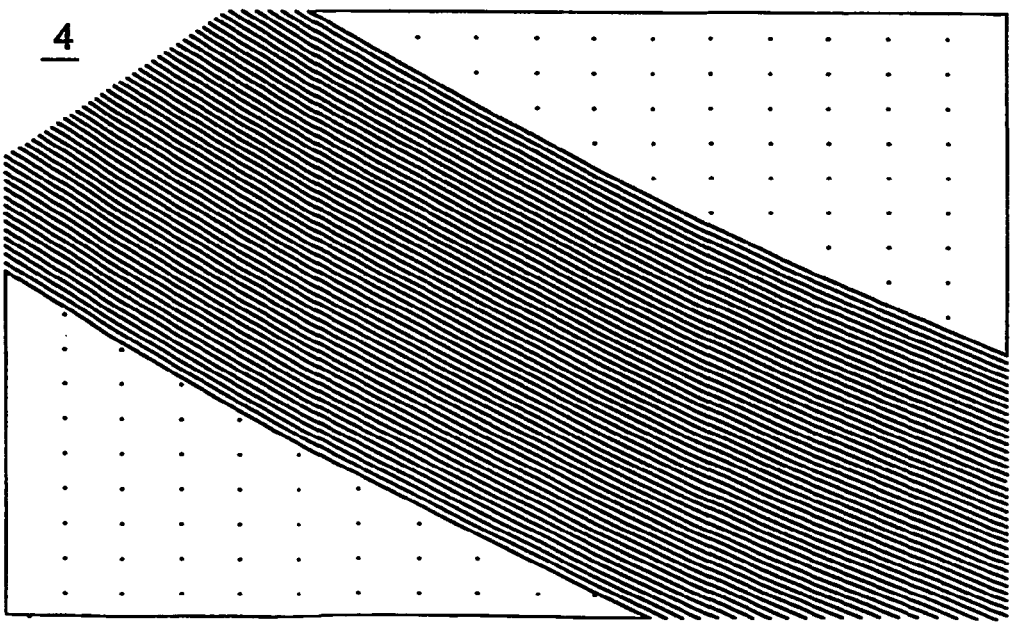

For comparison with FIGS. 6(a) and (b), FIGS. 7(a) and (b) show the corresponding input and output waveguide sections in the improved embodiment in which the input waveguides are inversely curved (with respect to direction of light travel) to the output waveguides, with the same magnitude of radius of curvature to the output waveguides, in corresponding (same length) portions adjacent the first and second slabs 3,4 respectively. Thus, in FIG. 7 the input waveguides bend towards the top edge of the AWG die (in plan view thereof), while the output waveguides bend towards the bottom edge. In this design the fan-in and fan-out regions can be considered as being "rotation-symmetric".

The input and output waveguides are preferably adiabatically tapered at the ends thereof which are coupled to the first and second slabs respectively, as in the first above-described embodiment. The inverse bending of the input waveguides compensates for the asymmetric effect on the output response due to waveguide bending, to produce a more symmetric output response as illustrated in the black line graph B in FIG. 5. The adjacent crosstalk is therefore improved (adjacent crosstalk is reduced).

Figure 6B:
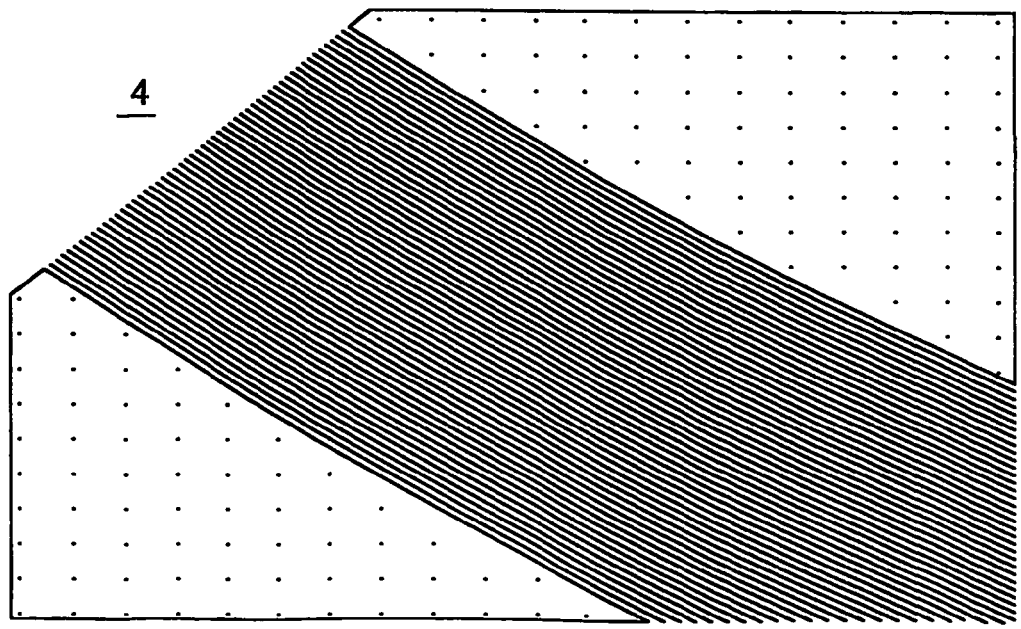

The reasons why a more symmetric response is obtained will be now be described briefly. An inherent characteristic of an AWG is that in the main image (or "focal") field, at the output side 5 of the slab coupler, the imaged mode field is substantially a mirror image of the input mode field (it is distorted to at least some extent due to the nature of the phase array properties of the AWG). The transmission spectrum (i.e. output spectral response) of each AWG channel is in effect a convolution of the image of the input field which appears at the output side 5 of the (output) slab coupler, with the (eigen-) mode of the respective output waveguide 10. Where one or both of the input and output fields is asymmetric, the resulting transmission spectrum will in general by asymmetrical. The degree of asymmetry is determined by the shape of the input and output fields as well as their mutual orientation. Assuming perfect imaging of the AWG, the shape of the fields is mainly determined by the transmission properties of the fan-in and fan-out regions. The mutual orientation is determined by the orientation of the fan-in region with respect to the fan-out region. It will thus be appreciated that if an inverse bend is used on the input waveguide to the bend used on the output waveguides (at least for corresponding initial portions of the fan-in and fan-out regions), with respect to the direction of travel of light along the waveguides, the asymmetric mode field input by the bent input waveguide to the input slab coupler 3 is (substantially) mirrored in the image plane at the output side of the second slab 4, thus substantially matching the asymmetric mode of the bent output waveguide. This results in a convolution of two substantially identical asymmetric responses, which results in a symmetrical channel output response (i.e. transmission spectrum) as illustrated in the black line graph in FIG. 5. (By comparison, in the original embodiment of FIGS. 6(*a*) and (*b*) it will be apparent that when the asymmetric mode in the bent input waveguide is generally mirrored by the AWG the resulting asymmetric mode field imaged at the output side 5 of the output slab coupler 4 will be generally (but not exactly) oppositely skewed to the asymmetric mode of the similarly bent output waveguide, so that the resulting convolution is still asymmetric.)

Although in the ideal embodiment the relevant (substantially identically bent) portions of the input waveguides will have exactly the same magnitude radius of curvature, but be inversely curved, to the corresponding (substantially identically bent) portions of the output waveguides, it will be understood that some variation between the radius of curvature of the corresponding bent input and output waveguide portions is tolerable without preventing a more symmetric channel output response being achieved, although the full benefit of exactly matching the magnitude of the input and output bends will not be achieved. In general, a variation of at least a few millimeters is likely to be tolerable, but preferably no more than this, most preferably no more than 0.5 mm variation, is used.

It will be appreciated that the terms "input" and "output", as used above to describe the waveguides, are used with reference to the use of the AWG as a demultiplexer. However, the same AWG could equally be used as a multiplexer in which case the input and output waveguides function as output and input waveguides, respectively. Therefore the accompanying claims shall be read as covering an AWG suitable for use as a demultiplexer, a multiplexer or a device which can function as both (i.e. a mux/demux device).

The invention claimed is:

1. An arrayed waveguide grating (AWG) device comprising: first and second slab couplers between which an input optical signal propagates front a first position on a first side of the first slab coupler to a second position on a second side of the second slab coupler, a correspondence between said first and second positions depending upon a wavelength of the optical signal; a plurality of array waveguides coupled between a second side of the first slab coupler and a first side of the second slab coupler; and a plurality of output waveguides coupled at one end to the second side of the second slab coupler; wherein the output waveguides are arranged to fan-out from the second slab coupler in a fan-out region of the device which comprises an initial portion in the length of each output waveguide, and the waveguides in the fan-out region are substantially identically curved in at least portion of the fan-out region adjacent the respective tapered ends thereof.

2. An AWG device according to claim 1, wherein the output waveguides all have substantially the same radius of curvature in at least a portion of the fan-out region.

3. An AWG device according to claim 1, wherein the output waveguides each have a continuously varying radius of curvature, in the fan-out region, and the radius of curvature of each waveguide varies substantially identically to that of the other waveguides, along corresponding portions of the lengths thereof; in at least a portion of the fan-out region.

4. An AWG device according to claim 1, wherein the output waveguides are substantially single mode waveguides which are tapered in width at the ends thereof which are coupled to the second slab coupler, so as to increase in width towards the second slab coupler.

5. An AWG device according to claim 1, wherein the radius of curvature of said substantially identically curved portions is kept sufficiently low to substantially filter out any pseudo higher order modes which arise where the output waveguides are coupled to the second slab coupler, while still being sufficiently high to avoid radiation losses above a predetermined maximum level, in the output waveguides.

6. An AWG device according to claim 5, wherein the output waveguides each comprise a core region having cladding material at least on either side of the core region, the difference between the refractive indices of the core region and the cladding material is 0.01, and the size of the core region is 6×6 µm in cross-section, and wherein the radius of curvature of the waveguides in the portion of the fan-out region in which the waveguides are substantially identically curved is in the range of 5.5 to 16 mm.

7. An AWG device according to claim 6, wherein the radius of curvature of the output waveguides in the portion of the fan-out region in which the waveguides are substantially identically curved is substantially 8 mm.

8. An AWG device according to claim 1, wherein the device is of generally planar rectangular shape, having an input edge, an output edge and two side edges, a second end of each output waveguide lies along the output edge of the device, and the output waveguides are substantially identically curved throughout a portion of the fan-out region which has a length in the range of 3–20% of the length of the fan-out region, as measured along a said side edge of the device which is perpendicular to the output edge of the device.

9. An AWG device according to claim 8, wherein the portion of the fanout region in which the output waveguides are substantially identically curved has a length in the range of 5–10% of the length of the fan-out region, as measured along said side edge of the device which is perpendicular to the output edge of the device.

10. An AWG device according to claim 1, wherein the waveguides are identically curved in at last a portion of the fan-out region.

11. An AWG device according to claim 1, wherein each of said substantially identically curved portions of the waveguides differs in curvature by no more than 1 mm radius of curvature from any other said substantially identically curved waveguide portion.

12. An AWG device according to claim 11, wherein each of said substantially identically curved portions of the waveguides differs in curvature by no more than 0.5 mm radius of curvature from any other said substantially identically curved waveguide portion.

13. An AWG device according to claim 1, further including a plurality of input waveguides coupled to a first side of the first slab coupler each input waveguide is tapered in width at the end thereof which is coupled to the first slab coupler, so as to increase in width towards the first slab coupler and the input waveguides are arranged to fan-in towards the first slab coupler, in a fan-in region which comprises a portion of the length of each input waveguide, and wherein all the input waveguides are substantially identically curved in at least a portion of the fan-in region.

14. An AWG device according to claim 13, wherein the substantially curved portions of the input waveguides are substantially inversely curved to said substantially identically curved portions of the output waveguides, with respect to the direction of travel of light along the waveguides.

15. An AWG according to claim 14, wherein the substantially identically curved portions of the input waveguides have a radius of curvature which is of equal magnitude to said substantially identically curved portions of the output waveguides.

16. An AWG according to claim 14, wherein the output waveguides are tapered in width at the ends thereof where they are coupled to the second slab coupler, said substantially identically curved portions of the input waveguides are adjacent the respective tapered ends of the input waveguides, and the substantially identically curved portions of the output waveguides are adjacent the respective tapered ends thereof.

17. An arrayed waveguide grating comprising:
a substrate having first and second slab couplers,
a plurality of array waveguides optically coupled between the first and second slab couplers and having respective predetermined optical path length differences therebetween;
at least one input waveguide being tapered in width at a first end and being optically coupled at said first end to an input side of the first slab coupler;
a plurality of output waveguides each being tapered in width at a first end thereof and being optically coupled at said first end to an output side of the second slab coupler;
the output waveguides being arranged to fan-out from the second slab coupler in a fanout region of the device which comprises an initial portion of the length of each output waveguide; wherein
the output waveguides in the fan-out region are substantially identically curved in a portion adjacent the respective tapered ends thereof;
each of said input waveguides is substantially rotation-symmetric to said substantially identically curved portion of the output waveguides, along a corresponding portion of said input waveguide adjacent the respective tapered ends thereof.

18. An AWG according to claim 17, wherein the or each said input waveguide has equal magnitude radius of curvature to said substantially identically curved portions of the output waveguides.

19. A multiplexer/demultiplexer comprising an AWG device according to claim 1.

20. A communications system incorporating at least one AWG device according to claim 1.

* * * * *